US010105907B2

(12) United States Patent
Valade

(10) Patent No.: US 10,105,907 B2
(45) Date of Patent: Oct. 23, 2018

(54) METHOD OF PRINTING AN OBJECT HAVING A SURFACE OF VARYING HEIGHT

(71) Applicant: OCE-TECHNOLOGIES B.V., Venlo (NL)

(72) Inventor: Cédric T. Valade, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 301 days.

(21) Appl. No.: 15/132,938

(22) Filed: Apr. 19, 2016

(65) Prior Publication Data

US 2016/0318258 A1 Nov. 3, 2016

(30) Foreign Application Priority Data

Apr. 29, 2015 (EP) .................................... 15165579

(51) Int. Cl.
*G06F 19/00* (2018.01)
*B29C 67/00* (2017.01)
(Continued)

(52) U.S. Cl.
CPC ........ *B29C 67/0088* (2013.01); *B29C 64/112* (2017.08); *B29C 64/386* (2017.08);
(Continued)

(58) Field of Classification Search
CPC ................................................ B29C 67/0088
(Continued)

(56) References Cited

U.S. PATENT DOCUMENTS 6,124,946 A * 9/2000 Norton ................ G06K 15/107
358/1.8
6,193,923 B1 2/2001 Leyden et al.
(Continued)

FOREIGN PATENT DOCUMENTS

EP 2 672 692 A2 12/2013

OTHER PUBLICATIONS

Qi, Qi, et al. "Properties of humidity sensing ZnO nanorods-base sensor fabricated by screen-printing." Sensors and Actuators B: Chemical 133.2 (2008): pp. 638-643.*
(Continued)

*Primary Examiner* — Satish Rampuria
(74) *Attorney, Agent, or Firm* — Birch, Stewart, Kolasch & Birch, LLP

(57) ABSTRACT

A printing system and method of printing an object having a surface of varying height, by a printer configured to print a number of pass images on top of each other in a number of passes, including: deriving from an object image a number of pass images to be printed on top of each other, including: establishing pass pixels of the pass images for which pass pixels a pass pixel height is defined, where a sum of the defined heights of a sequence of pass pixels that corresponds to a respective pixel of the object image equals the height of that pixel of the object image; and printing the pass images on top of each other. An amount of printed material that is printed per printed pass pixel is varied in accordance with the defined pass pixel heights. The pass pixels heights are selected, based on random data, from a respective set of at least two positive pass pixel heights.

11 Claims, 5 Drawing Sheets

(51) Int. Cl.
  *H04N 1/00* (2006.01)
  *G06K 15/10* (2006.01)
  *G05B 19/4099* (2006.01)
  *G06F 7/58* (2006.01)
  *H04N 1/54* (2006.01)
  *B29C 64/112* (2017.01)
  *B29C 64/386* (2017.01)
  *B33Y 50/02* (2015.01)
  *B33Y 10/00* (2015.01)

(52) U.S. Cl.
  CPC ........... *G05B 19/4099* (2013.01); *G06F 7/58* (2013.01); *G06K 15/105* (2013.01); *H04N 1/00827* (2013.01); *H04N 1/54* (2013.01); *B33Y 10/00* (2014.12); *B33Y 50/02* (2014.12); *G05B 2219/35134* (2013.01); *G05B 2219/49007* (2013.01); *G06F 2207/58* (2013.01)

(58) Field of Classification Search
  USPC .................................................. 700/117–126
  See application file for complete search history.

(56) References Cited

U.S. PATENT DOCUMENTS

| | | | |
|---|---|---|---|
| 6,508,535 B1* | 1/2003 | Klassen | B41J 2/2132 347/41 |
| 6,582,048 B1* | 6/2003 | Akahira | B41J 2/04505 347/106 |
| 8,976,415 B2 | 3/2015 | Klein Koerkamp et al. | |
| 2004/0183796 A1* | 9/2004 | Velde | B41C 1/00 345/419 |
| 2013/0330476 A1* | 12/2013 | Klein Koerkamp | B05D 5/06 427/258 |

OTHER PUBLICATIONS

Jost, Kristy, et al. "Knitted and screen printed carbon-fiber supercapacitors for applications in wearable electronics." Energy & Environmental Science 6.9 (2013): pp. 2698-2705.*

Rengier, Fabian, et al. "3D printing based on imaging data: review of medical applications." International journal of computer assisted radiology and surgery 5.4 (2010): pp. 335-341.*

* cited by examiner

10: Print controller
16: Print engine
18: Motion control system
20: Printheads
22: Support
24: UV curing device

METHOD OF PRINTING AN OBJECT HAVING A SURFACE OF VARYING HEIGHT

BACKGROUND OF THE INVENTION

1. Field of the Invention

The invention relates to a method of printing an object on a support, said object having a surface of varying height, by a printer configured to print a sequence of pass images on top of each other in a number of passes. Furthermore, the invention relates to a print system, in particular an ink jet print system, for printing an object on a support, said object having a surface of varying height, the print system being configured to print a sequence of pass images on top of each other in a number of passes. The term "printing" or "print" refers to building an object from print material by additive manufacturing, and includes, in particular, jetting print material for depositing the print material on the support or an already printed portion of the object.

2. Description of the Related Art

Recently, print systems have been developed that allow to print multilayer structures that can reach a considerable height as compared to conventionally printed images that are basically flat, or, at least, the height of which is generally disregarded. The structures are generated by stacking layers of material on top of each other. For example, radiation curable ink, in particular UV curable ink, may be used. By repeatedly printing a layer on top of a previously printed, cured layer, a multilayer structure may be built up having a defined height. For example, the height may be up to 10 mm or more. The height, i.e. the thickness of the printed structures, adds an extension in a further dimension to the two dimensional image, and, accordingly, such prints are termed 2.5D prints or relief prints. The printed structure may comprise an image, e.g. a color image.

U.S. Pat. No. 8,976,415 describes a method for generating relief prints, including processing a relief image, comprising color channels for indicating a color of each pixel and a height channel for indicating a height of each pixel, into several passes that are printed using a printer with several colorants including a white colorant. For each pixel a relief part, a white part and a skin part are discriminated. A height variation of individual pixels is caused by repetitive printing of colorants in the relief part. A number of pass images are derived from the relief image to be printed on top of each other. All available colorants may be used in the relief part, in order to provide for an optimal print speed for this part. The skin part comprises pass pixels for which a colorant composition based on the color channels of the relief image is established.

For printing relief prints or 3D prints, an object is built by stacking layers of material on top of each other. A slicing technique is known that consists in decomposing the object into a set of horizontal layers, which are printed on top of each other.

It is an object of the invention to provide a system and method that facilitate fast printing of relief prints or 3D prints with high surface quality or, in general, enhanced visual print quality of a relief or 3D printed object.

SUMMARY OF THE INVENTION

According to one aspect of the invention, this object is achieved by a method of printing an object on a support, said object having a surface of varying height, by a printer configured to print a number of pass images on top of each other in a number of passes, the method comprising the steps of:

defining an object image comprising height data for indicating a height of each pixel of the object image;

deriving from the object image a number of pass images to be printed on top of each other, comprising: establishing pass pixels of the pass images for which pass pixels a pass pixel height is defined, wherein a sum of the defined heights of a sequence of pass pixels that corresponds to a respective pixel of the object image equals the height of that pixel of the object image; and printing the pass images on top of each other, comprising: varying an amount of printed material that is printed per printed pass pixel of a pass image in accordance with the defined pass pixel heights of the pass pixels, wherein said establishing of pass pixels comprises: selecting, based on random data, pass pixel heights for pass pixels to be established from a respective set of at least two positive pass pixel heights.

The object has a surface of varying height, in particular of a height in a thickness direction or Z-direction that varies over X,Y-coordinates of the support. The height of the pixels correspond to an extension or thickness of the pixels in the Z-direction. The printed object is composed of slices or pass images printed on top of each other. However, the slices are generally not planar. Rather, different pass pixels of the pass images may be printed on slightly different altitudes, resulting from height variations from previously printed pass images. Moreover, a pass image may comprise pass pixels of different height. The height of a pixel is broken or split into a sequence of pass pixel heights of the pass pixels that contribute to the pixel. Preferably, in each printing pass, at most one pass pixel is printed on each position associated with a respective pixel. Preferably, each pass image is printed in a single printing pass. Preferably, the printer is configured to print, in a single pass, a pass image comprising pass pixels of at least two different pass pixel heights.

The term "selecting, based on random data" is used to comprise "randomly selecting", "selecting, by a random process", "selecting, based on stochastic data", "selecting, by a stochastic process" and, in particular, "selecting, based on pseudorandom data" and "selecting, by a pseudorandom process" and thus, includes data or random data processes or selecting processes that are deterministic but yield stochastic frequencies of the selections or the values of the random data on which the selections are based. For example, the random data may comprise a random number that is determined for each of the respective pass pixels, at which the selection is to be performed. For example, the random data may be determined using a random number generator procedure implemented in software of the printer or print system.

By said pass images, sequences of pass pixels and of corresponding pass pixel heights are assigned to pixels of the image. Due to said selecting based on random data, the composition of said sequences of pass pixel heights from different positive pass pixel heights is varied for respective pixels of the object image. Thus, the composition of said sequences of pass pixel heights from different positive pass pixel heights is randomized. In particular, said composition is varied based on said random data. In other words, deriving the sequence of pass images comprises varying the composition of sequences of pass pixel heights from different positive pass pixel heights for respective pixels of the object image, based on random data. In particular, the composition of sequences of pass pixel heights is varied even for pixels having the same height according to the print data. Thus, varying compositions of sequences of pass pixel heights result for respective pixels having a same height of the object image. The random variation of the pass pixel heights leads to different compositions of the sequences of pass pixel heights that, in particular, differ regarding the frequency of occurrence of pass pixel height values. Moreover, the sequence length of sequences of pass pixel heights corresponding to pixels of a same target height is varied, the sequence length being the number of pass pixels or pass pixel heights of the respective sequence. This implies, in general, that the target height of iso-elevated positions, i.e. positions of a same height, is not reached at the same printing pass. Still, however, the nominal pixel height, being the sum of the pass pixel heights of the corresponding sequence of pass pixels, is equal to the height of the corresponding pixel of the object image. Thus, in particular, no noise is intentionally added to the defined geometry of the object. Iso-elevated positions are to be understood as being those positions on the X,Y-plane where the same target height is specified for the object. On a sphere or a semi-sphere, any set of iso-elevated positions corresponds to a ring line.

For example, the method may include defining target height data for indicating an target height of each pixel of the object image, the target height data being defined in dependence on the height data. For example, the target height is at most the pixel height. For example, the target height data may be defined to indicate a target height equal to the height of each pixel. For example when the object is to be composed of different parts or layers arranged on top of each other, target height data may be defined specifically for one or more of the parts. In particular, target height data may be defined for an elevation part having a surface of varying height that is covered by one or more parts of a generally constant or uniform height. For example, when the object is a relief print comprising an elevation part of varying height, an isolation part of generally constant height, and a skin part e.g. of negligible height, the parts being printed on top of each other, target height data may be defined to indicate a target height of the elevation part. For example, the target height may be the pixel height less a constant or uniform height. Said constant height may be a height of the isolation part and, optionally, the skin part.

For example, the object may be composed of different parts arranged on top of each other, and a first target height is defined for a first part, and at least one second target height is defined for at least one second part above the first part. For example, the step of establishing pass pixels may be split, for each pixel that comprises more than one of the parts, into establishing a respective first part of the sequence of pass pixels according to the target height associated with the first part, and establishing at least one respective second part of the sequence of pass pixels according to the target height associated with the respective second part. For example, this may be applied for varying the pass pixel height composition of an elevation part as well as an isolation part of an object.

The amount of printed material that is printed per printed pass pixel is the printing material deposition amount per printed pass pixel. Thus, the established amount of printed material, or colorant, is applied on a position of the support, an X,Y-position, associated with the corresponding pixel in the object image. For example, said amount of printed material that is printed per printed pass pixel of a pass image may be varied proportional to the defined pass pixel heights of the pass pixels.

The method may include defining a height parameter for establishing a relation between the amount of printed material that is printed per printed pass pixel of a pass image and an expected actual height of the resulting printed pass pixel. However, the method may also be performed using relative heights without referring to actual heights.

For example, the object may be a relief print, and may be printed on a support in form of a substantially flat substrate.

For example, the object may be at least a part of a 3D structure, and may be printed on a support in form of an other part of the 3D structure or on a support in form of a substantially flat substrate.

For example, said selecting may be performed under the condition that each of said at least two positive pass pixel heights of the set in sum with pass pixel heights of any other established pass pixels of the corresponding sequence of pass pixels is within a target height defined in dependence on the height of the corresponding pixel of the object image. For example, the method may comprise setting a predetermined height for pass pixels to be established, if said condition relating to the heights of the set of pass pixel heights is not fulfilled.

Preferably, said establishing of pass pixels comprises, for a respective pass pixel, determining whether said condition that each of said at least two positive pass pixel heights of the set in sum with pass pixel heights of any other established pass pixels of the corresponding sequence of pass pixels is within a target height is fulfilled, and, if it is determined that the condition is fulfilled, selecting, based on random data, a pass pixel height of said set of at least two positive pass pixel heights for the pass pixel to be established.

For example, deriving the pass images and printing the pass images may be performed concurrently and/or alternating, or printing may be delayed until at least one, at least some or all of the pass images that are to be printed on top of each other have been derived.

The inventors have found that, when pass pixels of different heights are used for building an elevation or relief part of relief prints, and an available maximum pixel height is always selected as long as it fits within the defined relief height, visible contouring artifacts can occur on smoothly sloped surfaces of relief prints at positions of contours or borders of comparatively thick relief layers, which have been printed with a maximum pass pixel height, adjacent to stacked thin layers, which have been composed of multiple pass pixels of a low height printed on top of each other. This contouring artifact has been found to be even visible if the thick layers are buried below the surface of the relief print. It is assumed that this undesired effect may be due to different curing behavior of pass pixels of different heights, as well as effects due to droplet satellites, material coalescence or other material effects that influence the additive manufacturing build process, resulting, for a pixel of a given nominal pixel height, in a dependence of the actual height of the printed pixel on the number of pass pixels the printed pixel is composed of, and on the pass pixel heights thereof. This specific contouring effect could be reduced by using only a single, relatively small, uniform pass pixel height. However, in order to speed up the printing process, it is desirable to print underground layers of considerably increased height.

The above described aspect of the invention solves this dilemma. Since, according to the above aspect of the invention, pass pixel heights from a set of at least two positive pass pixel heights are selected based on random data, the above described contouring effect is visually reduced by breaking the spatial contouring pattern of iso-elevated positions. Still, pass pixels of different heights are used, allowing for accelerating the printing process.

Different from always selecting a maximum available pass pixel height within the height limit according to the corresponding pixel height, however, a variation of the composition of the sequences of pass pixel heights is achieved by selecting, based on the random data, pass pixel heights from at least two positive pass pixel heights. Thus, the Z-resolution of the printer is randomly varied by varying the pass pixel heights derived from the object image. The variation is achieved by changing the droplet volume of the jetted material in case of ink jet printing.

Preferred embodiments are indicated in the dependent claims.

Preferably, said establishing of pass pixels further comprises: choosing a set of at least two positive pass pixel heights from different sets of respective at least two positive pass pixel heights, dependent on a remaining height in form of the difference between the target height of the corresponding pixel of the object image and the sum of pass pixel heights of any other established pass pixels of the corresponding sequence of pass pixels, and wherein the chosen set is used for said selecting of pass pixel heights based on random data.

Thus, different sets of respective at least two positive pass pixel heights may be used dependent on an available range or remaining height between the sum of pass pixel heights of any other established pass pixels of the corresponding sequence of pass pixels and the target height. Thus, the heights of the pass pixels to be established may be adapted to the overall target height of the pixel or, when heights of some pass pixels of the corresponding sequence of pass pixels have already been established, the heights of further pass pixels to be selected for the sequence may be adapted to the remaining available range. Thus, the printing speed may be further improved.

In particular, said choosing of a set may comprise the above described determining whether said condition is fulfilled for a set to be chosen.

For example, a maximum positive pass pixel height of the pass pixel heights of said sets may be at least five times, preferably at least ten times, the minimum positive pass pixel height of the pass pixel heights of said sets. Thus, a large variation of pass pixel heights may be provided for.

For example, at least one set may comprise an absolute minimum positive pass pixel height that corresponds to a minimum or elementary droplet volume of the printer. It represents the maximum precision of the printer in the Z-direction. For example, different pass pixel heights may be defined in integer multiples of an elementary height unit ED, which preferably is the absolute minimum positive pass pixel height. ED may e.g. be in the range up to 10 μm, e.g. 1 μm or 1.7 μm.

For example, at least one set may comprise an absolute maximum positive pass pixel height that corresponds to applying, for printing a pass pixel in a single pass, colorants or inks of the printer using all printheads available for printing in a single pass, and applying each of the colorants or inks with a maximum depositable volume or maximum droplet volume. Thus, by using all colorants or inks, the maximum pass pixel height can be increased.

Preferably, at least one set of respective pass pixel heights is used for said selecting, which set comprises a first pass pixel height and a second pass pixel height, which is at least 1.5 times the first pass pixel height, i.e. at least 150% of the first pass pixel height. Providing a set with large differences between the pass pixel heights may improve the printing speed as well as the variation in the composition of the respective sequences of pass pixel heights.

Preferably, at the same time, said second pass pixel height is at maximum 3.5 times the first pass pixel height, i.e. at maximum 350% of the first pass pixel height. Providing a set with such limited differences between the pass pixel heights may improve the printing speed while still allowing considerable variation in the composition of the respective sequences of pass pixel heights.

Preferably, said selecting based on random data comprises:
  obtaining random data in the form of a random number,
  comparing the obtained random number to at least one threshold level associated with the respective set of pass pixel heights, and
  selecting one of the pass pixel heights of the respective set of pass pixel heights based on the result of the comparison.

Generally, a set or series of n+1 pass pixel heights, n being a positive integer number, may be associated with a number of n threshold level(s). For example, when a set of pass pixel heights consists of two positive pass pixel heights, one threshold level may be associated with the set, and a first or a second of the pass pixel heights of the set may be selected, depending on whether the obtained random number exceeds the threshold level. For example, when a set consists of three positive pass pixel heights, two threshold levels may be distinguished to decide which of the three pass pixel heights is selected.

For example, random data in form of a random number may be obtained from a random number generator. Random number generators, in particular, pseudorandom number generators, are known as such in the art.

However, different random data may be used, as well. For example, a random number pattern similar to a random dot type pattern may be overlaid with the object image in a repetitive manner, and said selecting based on random data may comprise: obtaining random data in the form of a random number by looking-up the random number in the random pattern at a position of the random pattern associated with a position of the respective pass pixel to be established; comparing the obtained random number to at least one threshold level associated with the respective set of pass pixel heights; and selecting one of the respective set of pass pixel heights based on the result of the comparison. The pattern may be stored in a memory of the printer or print system.

Other random or pseudo-random based selection procedures or mixtures of the described procedures may be used as well.

In general, the random number may take at least as many different values as the number of elements of the respective set of pass pixel heights. For example, the random data, the random number generator, or the random number pattern is configured to allow the random number to take at least as many different values as the number of elements of the respective set of pass pixel heights.

Preferably, said selecting based on random data is mainly a selecting between equally probable first and second pass pixel heights of the respective set of pass pixel heights. For example, said selecting based on random data may on average yield probabilities p1, p2 of at least 0.4, i.e. at least 40%, for each of the first and second pass pixel heights. In other words, said selecting based on random data is configured to provide for substantially equal probabilities of selecting a respective first and a respective second pass pixel height of said respective set of pass pixel heights.

For example, said selecting based on random data may be comprise, for a set of two pass pixel heights, selecting the first pass pixel height of the set with a probability p1, and selecting the second pass pixel height of the set with a probability p2=1−p1. Preferably, p1=p2=0.5.

By adapting the pass pixel heights to select from, and by adapting the probabilities for the selecting step, a tradeoff adjustment may be made between print quality and productivity. For example, a high resolution may be forced by providing for a higher probability of thin pass images, or pass pixels of small height, and a low resolution may be forced by providing for a height probability of thick pass images, or pass pixels of large height.

Preferably, pass pixel heights are individually assigned to the respective pass pixels. Thus, the spatial contouring pattern may be visually reduced on a fine level of resolution.

Preferably, the pass images include pass images which each comprise pass pixels of at least two different positive respective pass pixel heights. Combining pass pixels of different pass pixel heights to one pass image may facilitate accelerating the printing process.

In one embodiment, the method is a method of printing an object on a support, said object having a surface of varying height, by a printer comprising a number of colorants, said printer being configured to print a number of pass images on top of each other in a number of passes, and
- wherein said step of defining a object image is a step of defining an object image comprising height data for indicating a height of each pixel of the object image and comprising color data for indicating a color of each pixel, and
- wherein the method further comprises the steps of:
- discriminating in the object image for each pixel from the support to the surface of the object an elevation part, an optional isolation part, and a skin part; and
- establishing a colorant composition of pass pixels based on a part of the pixel to which the pass pixel contributes; and
- wherein the step of printing the pass images on top of each other is a step of printing the pass images on top of each other by applying said established colorant composition for printing the pass pixels, comprising said varying an amount of printed material that is printed per pass pixel, and
- wherein the elevation part comprises an arbitrary colorant composition, the optional isolation part comprises mainly one of the colorants, and the skin part comprises colorants according to the color of the corresponding pixel.

Thus, printing of colored relief or 3D objects may be accelerated while visually reducing the above described contouring effect. The established colorant composition is applied on a position of the support, an X,Y-position, associated with the corresponding pixel in the object image. For example, the isolation or cover part isolates the skin part from the elevation part and/or covers the elevation part. For example, the isolation part is a uniformly colored isolation layer. For example, the isolation part has a generally constant height. Preferably, the printer comprises a number of colorants including a white colorant, and the isolation part is a white part and comprises mainly white colorant. The step of selecting based on random data may be performed for one or more parts of the object image. Preferably, the step of selecting based on random data is performed for pass pixels that contribute to the elevation part. For example, the step of selecting based on random data may be performed for the isolation part, as well.

Preferably, the printer comprises a number of colorants, and varying the amount of printed material that is printed per printed pass pixel of a pass image comprises varying a number of colorants used for printing a respective pass pixel and/or varying an amount of at least one of said colorants used per printed pass pixel of the pass image. Thus, a large range of available pass pixel heights can be provided.

For example, a pass pixel is included in a pass image only if the position in the height direction of the pass pixel and a lowermost position in the height direction of any other pass pixel of the pass image do not exceed a predetermined absolute altitude span. Thus, lowermost positions may be filled preferentially. The absolute altitude span may be defined dependent on the allowable distance of the printhead from the built-up object, in order to achieve an accurate deposition of the pass pixels.

Preferably, in the step of deriving a number of pass images, at least for pixels of the object image that have a height which exceeds a predetermined height threshold by an exceeding height, the heights of the pass pixels of the corresponding sequence of pass pixels are established based on random data at least for pass pixels that make up for a predominant portion of the exceeding height.

The predominant portion is understood to comprise more than 50% of the exceeding height. Thus, the composition of the respective sequence of pass pixels and, in particular, the composition of the corresponding sequence of pass pixel heights, is to a large extent determined by the random selecting step. Thus, the variation of the pass pixel height sequences may be increased. The height threshold may be predetermined to account for target heights that are below the smallest maximum pass pixel height of the used sets of pass pixel heights, so that the corresponding sequence of pass pixels is established without random selection of pass pixel heights. The height threshold may be predetermined to further account for a height or thickness of layers, such as the isolation layer and/or skin layer, the height of which is not included in the current target height.

It is regarded as particularly advantageous if, on average, a high probability results for the topmost pass pixels of sequences of pass pixels that correspond to pixels of a same height belonging to different pass images and, furthermore, being printed in different printing passes.

According to another aspect of the invention, there is provided a print system for printing an object on a support, said object having a surface of varying height, the print system being configured to print a number of pass images on top of each other in a number of passes, the print system comprising: a print controller; and a print engine, wherein the print controller is configured to perform the method of printing an object on a support as described above, comprising transferring said established pass images to the print engine, which is configured to print the pass images on top of each other in a predetermined order, comprising: varying an amount of printed material that is printed per printed pass pixel of a pass image in accordance with the defined pass pixel heights of the pass pixels.

In one embodiment, the print engine comprises a number of colorants, wherein the print engine is configured to print the pass images on top of each other in a predetermined order by applying said established colorant composition for printing the pass pixels, comprising said varying an amount of printed material that is printed per pass pixel.

BRIEF DESCRIPTION OF THE DRAWINGS

Embodiment examples of the invention will now be described in conjunction with the drawings, wherein.

DETAILED DESCRIPTION OF EMBODIMENTS

Figure 1:
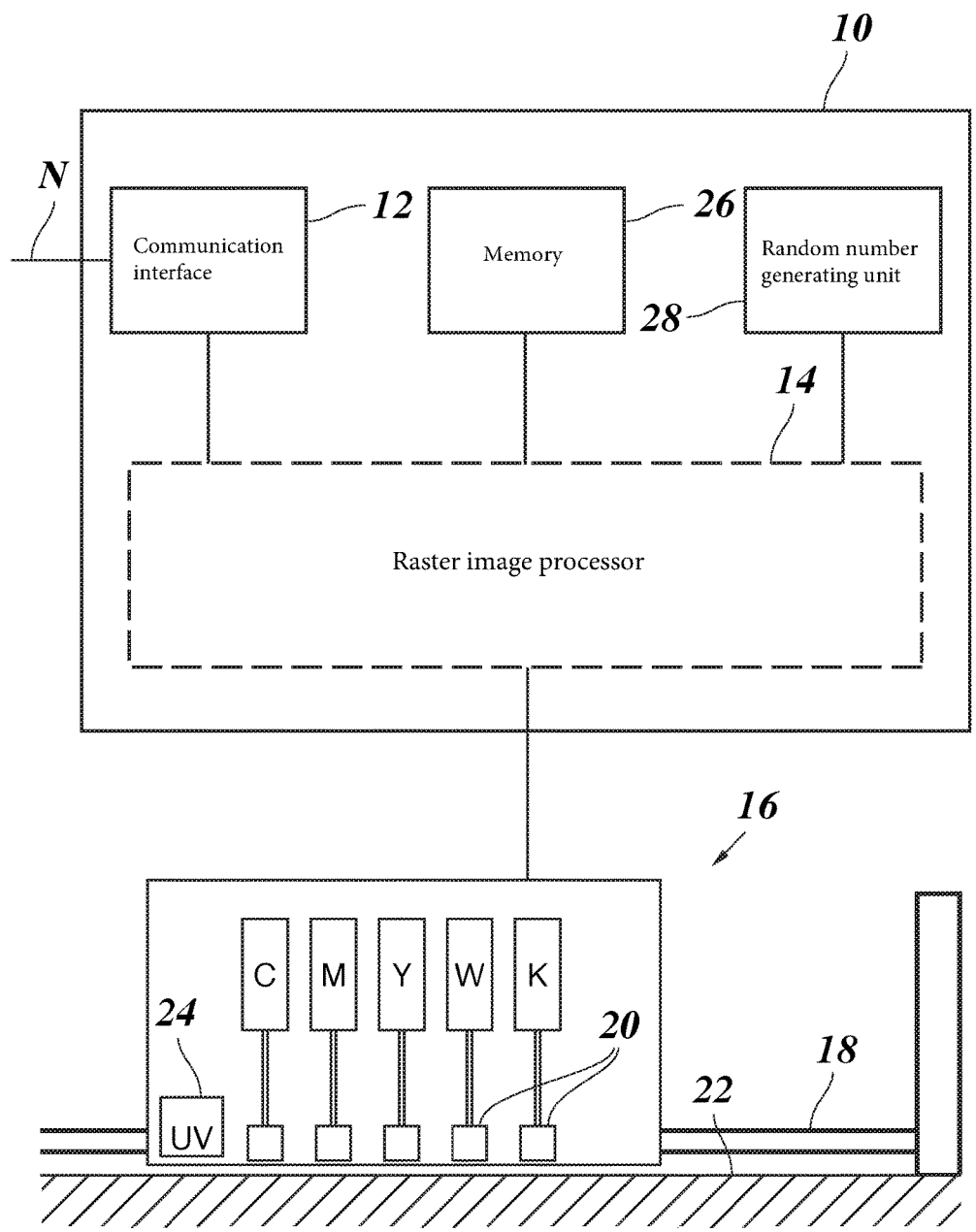
FIG. 1 is a block diagram of a printing system according to the invention.

FIG. 1 schematically shows a print system for printing 3D objects by depositing material on a support in a number of printing passes. A print controller 10 receives print data in the form of a rasterized object image comprising height data, e.g. in the form of a height channel, for indicating a height of each pixel of the rasterized object image, and comprising color data, e.g. in the form of a number of color channels, for indicating a color of each pixel. For example, there are five customary color channels for colorants of the colors cyan (C), magenta (M), yellow (Y), white (W), black (K). The height data specify, for two-dimensional print coordinates X, Y, the height of the respective pixel of the image. The height data describes a height, i.e. a thickness, of the object in the third dimension Z.

The print controller 10 includes a communication interface 12 connected e.g. to a network N for receiving the print data, and a raster image processor 14 configured for converting the print data into a number of pass images in a format suitable for driving a print engine 16 synchronized with a motion control system 18 configured for controlling relative motion between printheads 20 of the print engine 16 and a support 22. The motion control system 18 comprises print carriage motion controllers of first and second printing directions X, Y and, optionally a print carriage height controller Z for controlling a height of the printheads 20 above the support 22. For example, the motion control system 18 is configured to control relative motion between the printheads 20 and the support 22 in the X, Y, and Z direction. The printheads have nozzles for jetting the colorants onto the support. The print system is a system for printing relief prints using UV curable ink and includes a UV curing device 24.

The print controller 10 further comprises a memory 26 and a random number generating unit 28 in form of a pseudorandom number generator, which may be implemented in software.

In the following, printing of a 2.5D object will be exemplarily explained with respect to FIGS. 2-4.

Figure 2:
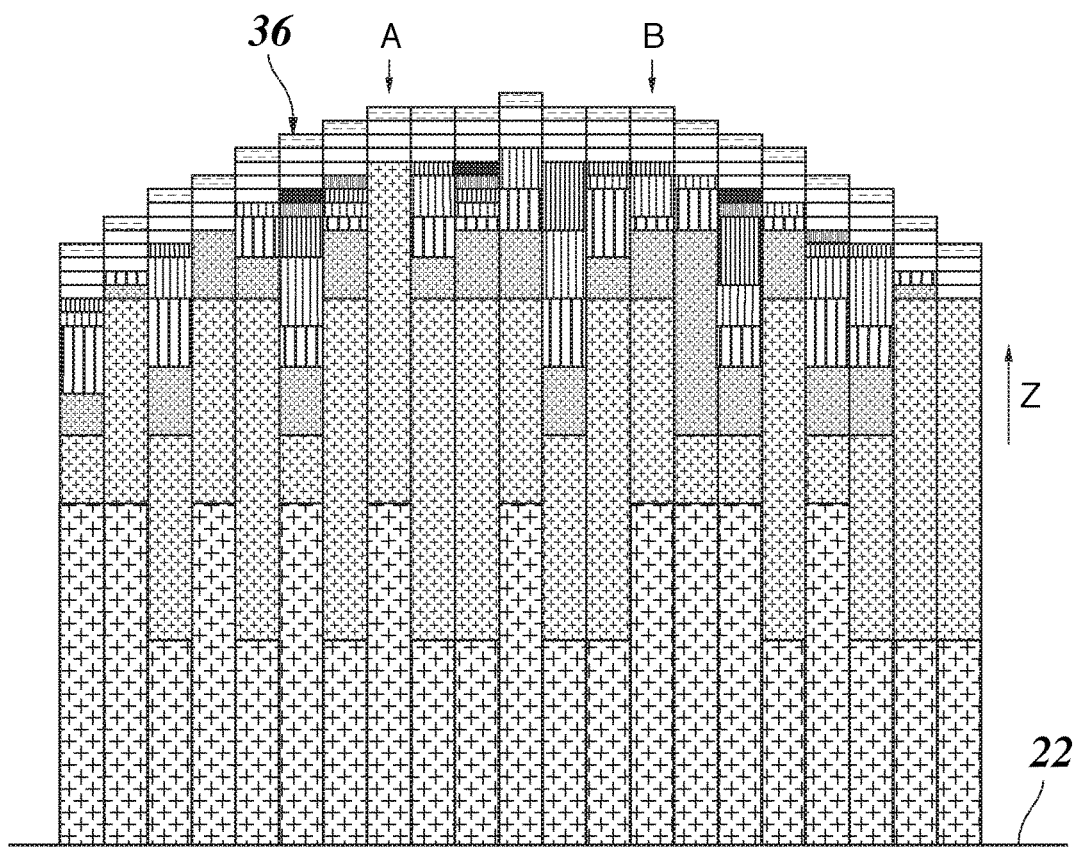
FIG. 2 is a schematic illustration of a relief print for illustrating the invention.
Figure 2:
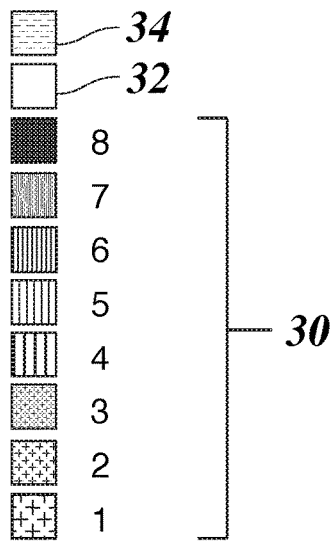

FIG. 2 is a cross cut of a 2.5D structure printed in a number of printing passes. The structure is built up of a number of pass images 1, 2, 3, 4, ... which are printed on top of each other. FIG. 2 shows a relative height of individual pass pixels of the pass images. Different filling patterns are used to indicate the different pass images. The numbers of the pass images, to which the pass pixels belong, are indicated with the associated filling patterns. The pass images comprise pass images that include pass pixels of two or more different heights.

In the example of FIG. 2, the structure comprises three parts or layers that are printed on top of each other: an elevation part 30 having a varying height, a white part 32 that covers the elevation part 30, and a skin part 34 on top of the white part 32. The skin part 34 forms the top surface 36 of the structure and reproduces e.g. an image by different colors. The overall height of the structure is determined by the height of the elevation part 30, the height of the white part 32, which e.g. may be constant, and the height of the skin part 34. However, the height of the skin part 34 may be neglected, as its function is to reproduce the image according to the color data of the object image. The elevation part 30 is printed with arbitrary colorants. The white part 32 is printed mainly with white colorant, in order to provide a background of uniform hue and brightness for the colored skin part 34.

The pass pixel heights of those pass pixels that contribute to the elevation part 30 of the respective pixels are randomly varied. For example, the pass image 1 comprised pass pixels of relative heights of 15 and 25 ED, the different pass pixel heights being defined in integer multiples of an elementary height unit ED, which e.g. is 1.7 μm.

Each pass image is printed in a single printing pass or printing swath of the printhead 20. When printing a pass image, the amount of printed material, e.g. colorant, that is deposited per printed pass pixel of the pass image is varied in accordance with the pass pixel heights of the pass pixels. The amount of printed material may be varied by varying the number of colorants used as well as varying the amount or volume of colorant that is printed using the respective colorant. For example, for printing a pass pixel of a height of 15 ED, three arbitrary colorants or printheads may be used, each printhead ejecting a droplet volume corresponding to 5 elementary droplet volumes.

In FIG. 2, two pixels A, B are indicated with arrows, which pixels have the same pixel height of 53 ED, excluding the skin part 34. Due to the random variation of the pass pixel heights contributing to the elementary part 30, however, the pixels A, B of the same height are built up from different sequences of pass pixels and corresponding pass pixel heights: whereas pixel A is composed of elevation part pass pixels having the heights of 25, 25 and white part pass pixel heights of 1, 1, 1, as well as a skin part pass pixel, the pixel B has elevation part pass pixel heights of 25, 15, 5, 1, 3, 1 and white part pass pixel heights of 1, 1, 1, as well as a skin part pass pixel.

Thus, the random variation of the pass pixel heights leads to different compositions of the sequences of pass pixel heights that, in particular, differ regarding the frequency of occurrence of pass pixel height values. Moreover, the number of contributing pass pixels differs for the indicated pixels. Thus, for iso-elevated positions on the X,Y-plane, such as the two indicated pixels, the slicing sequences, i.e. the sequences of pass pixels and corresponding pass pixel heights of which the pixels are composed of, may be different.

When deriving the sequence of pass images, the height reached by the respective pass pixel determines which part the pass pixel belongs to, e.g. to the elevation part 30, the white part 32, or the skin part 34.

Figure 3:
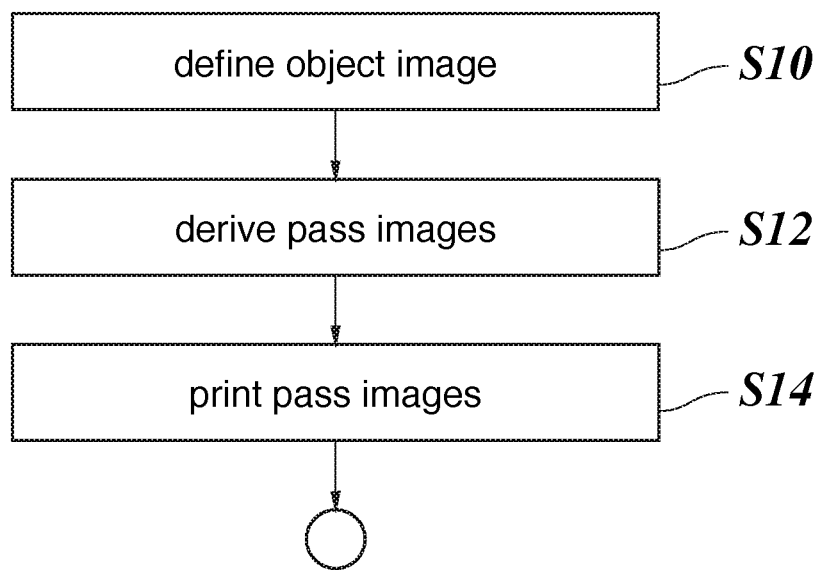
FIG. 3 is a flow diagram illustrating a method of printing an object on a support.

The raster image processor 14 receives the rasterized object image comprising height data and color data, step S10 of FIG. 3, and thereby defines the object image. From the object image, the raster image processor 14 derives a number of pass images, step S12, as follows, and the pass images are printed, step S14. The steps of deriving the number of pass images and printing may overlap or be performed in parallel. For example, pass images may sequentially be derived, in the order from bottom to top. For example, deriving and printing the pass images may be interweaved or interlaced in time.

Figure 4:
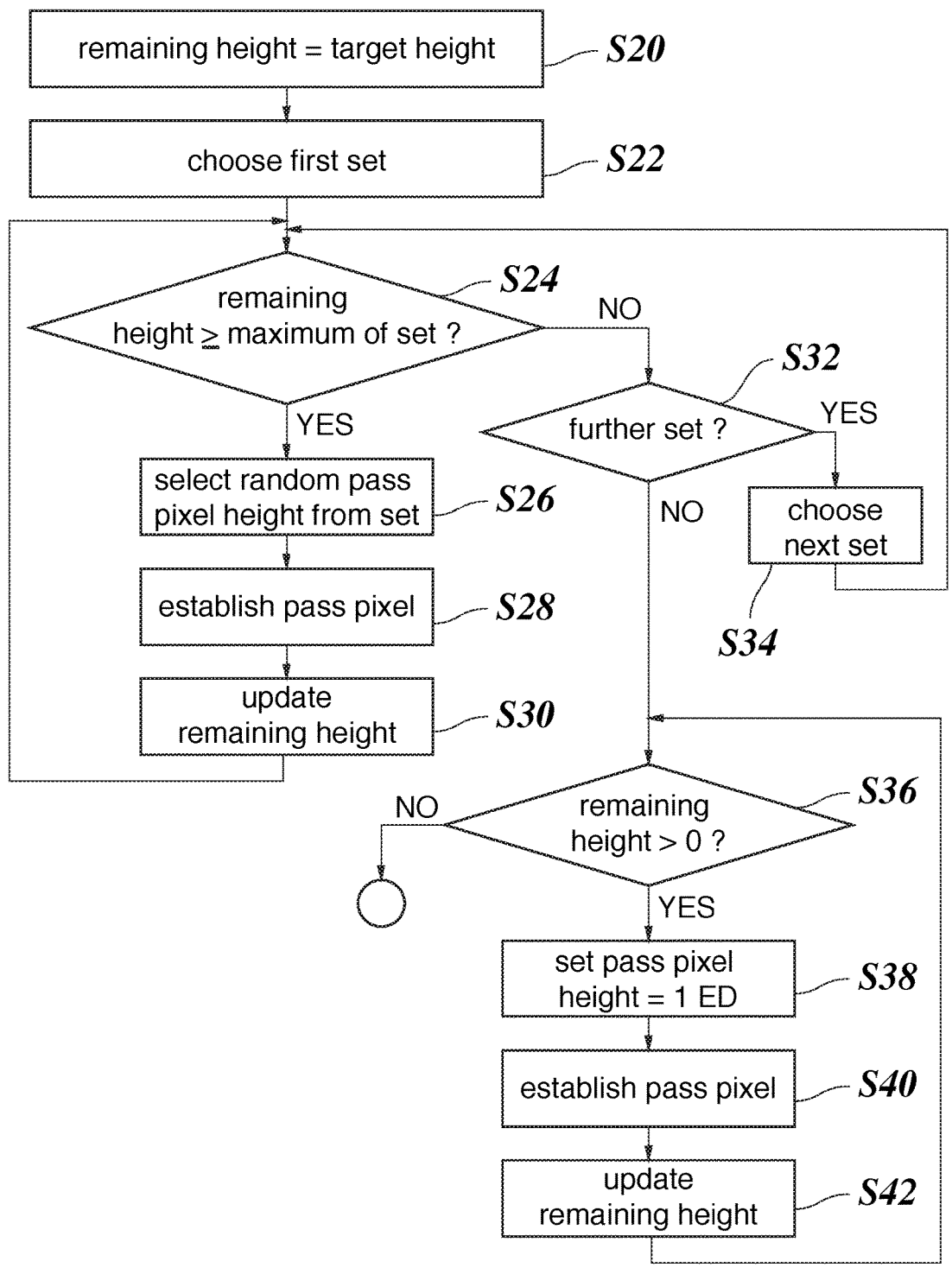
FIG. 4 is a flow diagram illustrating establishing pass images.

FIG. 4 illustrates how a sequence of pass pixel heights is established in step S12, for each pixel of the object image, from the bottom to the top.

The raster image processor 14 keeps track of the accumulated heights that are reached by already defined pass images in the memory 26. In particular, a remaining height is defined for the X, Y positions of the object image. For example, a remaining height map may be defined. The remaining height is initialized to the target height, e.g. the intended height of the elevation part 30, which is the pixel height according to the object image less a target thickness of the white part 32 of e.g. 3 ED, step S20.

A first set of pass pixel heights consisting of the heights of e.g. 25 ED and 15 ED is chosen to be used for randomly selecting a pass pixel height, step S22.

The remaining height, for each pixel position, is compared to the maximum height of the heights of the chosen set, step S24. In other words, it is determined whether the condition is fulfilled that each of the pass pixel heights of the chosen set of pass pixel heights is within the remaining height.

If the remaining height is at least the maximum of the pass pixel heights of the first set (e.g. for pixel B, remaining height of 50 ED is greater than 25 ED), a random pass pixel height is selected for the pass pixel from the first set of pass pixel heights, step S26.

In particular, said selecting may comprise obtaining random data in form of a random number from the random number generating unit 28, e.g. a random number in the range of 0 to 1, comparing the obtained random number to a threshold level of e.g. 0.5 associated with the first set of pass pixel heights, and selecting one of the pass pixel heights of the set based on the result of the comparison.

The selected pass pixel height is established as the pass pixel height of the respective pass pixel of the pass image, step S28 (e.g. height of 25 ED for pixel B in pass image number 1). The remaining height is then updated, i.e. reduced by the established pass pixel height, step S30.

The method continues with repeating step S24 of determining whether the condition is fulfilled that each of the pass pixel heights of the chosen set of pass pixel heights does not exceed the remaining height. This is equivalent to determining whether the condition is fulfilled that each of the pass pixel heights of the chosen set of pass pixel heights in sum with pass pixel heights of any other established pass pixels of the corresponding sequence of pass pixels is within a target height (e.g.: determining, whether each of 25 ED and 15 ED, in sum with already established 25 ED, is within target height of 50 ED).

If the condition is not fulfilled in step S24, it is verified whether a further set of pass pixel heights is available, step S32. If yes, a second set of pass pixel heights is chosen, step S34, and step S24 is repeated for determining whether the condition is fulfilled for the newly selected set.

For example, the following sets or series of pass pixel heights may be provided: first set of 25 ED and 15 ED, second set of 15 ED and 5 ED, third set of 5 ED and 3 ED, fourth set of 3 ED and 1 ED. For example, after pass pixels of 25 ED and 15 ED have been established for pixel B by choosing from the first set of 25 ED and 15 ED, it is checked whether the remaining height of 10 ED is equal to or larger than a maximum of the second set of 15 ED and 5 ED, in step S24. In a further iteration, the third set of 5 ED and 3 ED is chosen in step S34.

If no further set of pass pixel heights is available in step S32, i.e. the remaining height is not sufficiently high to allow a selection from all pass pixel heights of the currently chosen set of pass pixel heights, and there is no smaller set for further selecting available, the remaining height is filled up by establishing pass pixels of a deterministic height. For example, it is determined whether the remaining height is zero, i.e. 0 ED, step S36. If this is not the case, a deterministic thickness or height is set and established as the pass pixel height, e.g. a pass pixel height of 1 ED, steps S38, S40. The remaining height is updated, step S42, and the method repeats with step S36.

If the remaining height is zero, i.e., the target height is reached, the sequence of pass pixels up to the target height has been completed for the respective pixel. Thus, by using different sets of pass pixel heights, the target height is be pursued in progressively refined height steps, until the sum of the established pass pixel heights of a respective sequence has reached the height of the corresponding pixel.

For the white part 32, for example, the new remaining height is set to the target height of the white part 32, and pass pixels of a deterministic height of e.g. 1 ED may be established until the target height for the white part 32 is reached, similar to the sequence of steps S38, S40 and S42. If, for a pixel, the target height of the white part 32 is reached, a further pass pixel contributing to the skin part 34 is established.

For the pass pixels contributing to the elevation part 30, an arbitrary colorant composition is established based e.g. on the established pass pixel height. For pass pixels established to contribute to the white part 32, a white colorant composition is established. For the pass pixel contributing to the skin part 34, a colorant composition is established in accordance with the color data of the object image.

The establishing of pass pixels and pass pixel heights as explained above with reference to FIG. 4 is performed for each pixel of the object image. The established pass pixels are selected for respective pass images. This may be performed by establishing pass images one after the other, the procedure of FIG. 4 being performed in parallel for all pixels of the object image.

The established pass images are printed on top of each other in step S14, a curing operation being performed on the pass pixels before pass pixels of a following pass image are printed at the same X, Y position.

Figure 5:
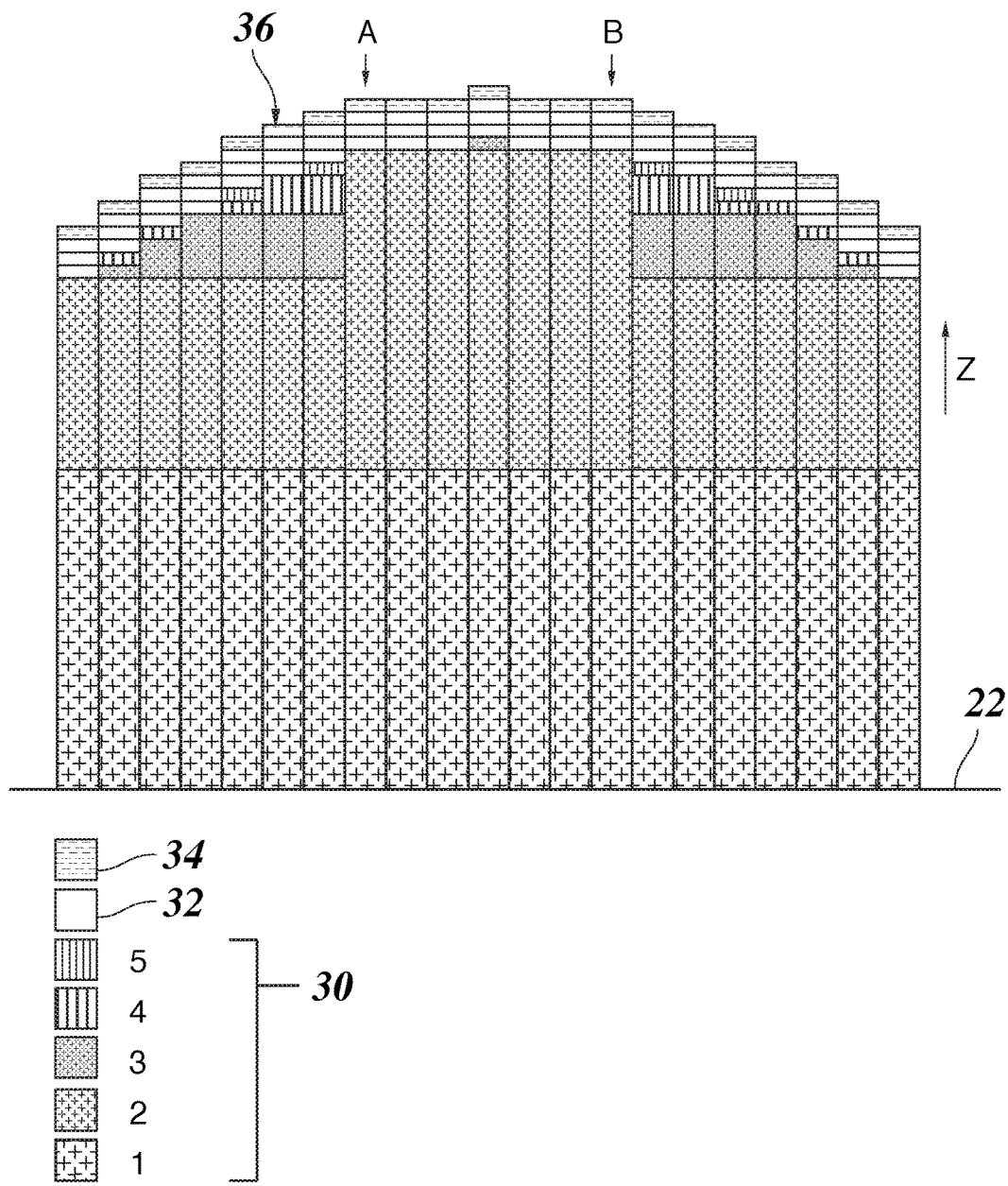
FIG. 5 is a comparative example of a relief print.

FIG. 5 shows a comparative example which differs from the example of FIG. 2 in that always the largest available pass pixel height is established for a pass pixel, under the condition that the established pass pixel height in sum with the pass pixel heights of any other established pass pixels of the corresponding sequence of pass pixels is within the respective target height. All pixels of a same height have the same sequence of pass pixel heights. Thus, a contouring artifact may be visible at the surface of the indicated pixels A, B, the positions of which correspond to a border of a comparatively thick slice formed by the pass image number 2. Assuming that the object is a half-sphere, the cross section being taken through the apex, the contouring artifact will typically be ring-shaped.

Whereas the method and print system have been described particularly with reference to printing droplets of jettable print material such as UV curable ink jet colorants, and printing a relief object having an elevation part, an isolation part and a skin part, the invention may be applied to any printing method that builds an object by stacking layers of material in an additive manufacturing way, including 2.5D printing and 3D printing.

The invention being thus described, it will be obvious that the same may be varied in many ways. Such variations are not to be regarded as a departure from the invention, and all such modifications as would be obvious to one skilled in the art are intended to be included within the scope of the following claims.

What is claimed is:

1. A method of printing an object on a support, said object having a surface of varying height, by a printer configured to print a number of pass images on top of each other in a number of passes, the method comprising the steps of:
    defining an object image comprising height data for indicating a height of each pixel of the object image;
    deriving from the object image a number of pass images to be printed on top of each other, comprising: establishing pass pixels of the pass images for which pass pixels a pass pixel height is defined, wherein a sum of the defined heights of a sequence of pass pixels that corresponds to a respective pixel of the object image equals the height of that pixel of the object image; and
    printing the pass images on top of each other, comprising: varying an amount of printed material that is printed per printed pass pixel of a pass image in accordance with the defined pass pixel heights of the pass pixels,
    wherein said establishing of pass pixels comprises: selecting, based on random data, pass pixel heights for pass pixels to be established from a respective set of at least two positive pass pixel heights, and
    wherein at least one set of respective pass pixel heights is used for said selecting, which set comprises a first pass pixel height and a second pass pixel height, which is at least 1.5 times the first pass pixel height.

2. The method according to claim 1, wherein said establishing of pass pixels further comprises: choosing a set of at least two positive pass pixel heights from different sets of respective at least two positive pass pixel heights, dependent on a remaining height in form of the difference between the target height of the corresponding pixel of the object image and the sum of pass pixel heights of any other established pass pixels of the corresponding sequence of pass pixels, and wherein the chosen set is used for said selecting of pass pixel heights based on random data.

3. The method according to claim 1, wherein said selecting based on random data comprises:
    obtaining random data in the form of a random number,
    comparing the obtained random number to at least one threshold level associated with the respective set of pass pixel heights, and
    selecting one of the pass pixel heights of the respective set of pass pixel heights based on the result of the comparison.

4. The method according to claim 1, wherein said selecting based on random data is mainly a selecting between equally probable first and second pass pixel heights of the respective set of pass pixel heights.

5. The method according to claim 1, wherein pass pixel heights are individually assigned to the respective pass pixels.

6. The method according to claim 1, wherein the pass images include pass images which each comprise pass pixels of at least two different positive respective pass pixel heights.

7. The method according to claim 1,
    wherein the method is a method of printing an object on a support, said object having a surface of varying height, by a printer comprising a number of colorants, said printer configured to print a number of pass images on top of each other in a number of passes, and
    wherein said step of defining an object image is a step of defining an object image comprising height data for indicating a height of each pixel of the object image and comprising color data for indicating a color of each pixel, and
    wherein the method further comprises the steps of:
        discriminating in the object image for each pixel from the support to the surface of the object an elevation part, an optional isolation part, and a skin part; and
        establishing a colorant composition of pass pixels based on a part of the pixel to which the pass pixel contributes; and
    wherein the step of printing the pass images on top of each other is a step of printing the pass images on top of each other by applying said established colorant composition for printing the pass pixels, comprising said varying an amount of printed material that is printed per pass pixel, and
    wherein the elevation part comprises an arbitrary colorant composition, the optional isolation part comprises mainly one of the colorants, and the skin part comprises colorants according to the color of the corresponding pixel.

8. The method according to claim 1, wherein the printer comprises a number of colorants, and wherein varying the amount of printed material that is printed per printed pass pixel of a pass image comprises varying a number of colorants used for printing a respective pass pixel and varying an amount of at least one of said colorants used per printed pass pixel of the pass image.

9. The method according to claim 1, wherein in the step of deriving a number of pass images, at least for pixels of the object image that have a height which exceeds a predetermined height threshold by an exceeding height, the heights of the pass pixels of the corresponding sequence of pass pixels are established based on random data at least for pass pixels that make up for a predominant portion of the exceeding height.

10. A print system for printing an object on a support, said object having a surface of varying height, a printer configured to print a number of pass images on top of each other in a number of passes, the printer comprising:
    a print controller; and
    a print engine,
    wherein the print controller is to:
    receive an object image comprising height data for indicating a height of each pixel of the object image;
    derive from the object image a number of pass images to be printed on top of each other, comprising: establishing pass pixels of the pass images for which pass pixels a pass pixel height is defined, wherein a sum of the defined heights of a sequence of pass pixels that corresponds to a respective pixel of the object image equals the height of that pixel of the object image; and
    transfer said pass images to the print engine, which is to print the pass images on top of each other in a predetermined order, comprising: varying an amount of printed material that is printed per printed pass pixel of a pass image in accordance with the defined pass pixel heights of the pass pixels, and wherein said establishing of pass pixels comprises: selecting, based on random data, pass pixel heights for pass pixels to be established from a respective set of at least two positive pass pixel heights, and wherein at least one set of respective pass pixel heights is used for said selecting, which set comprises a first pass pixel height and a second pass pixel height, which is at least 1.5 times the first pass pixel height.

11. The print system according to claim 10, wherein the print engine comprises a number of colorants, wherein the print controller is to:

receive an object image comprising height data for indicating a height of each pixel of the object image and comprising color data for indicating a color of each pixel;

discriminate in the object image for each pixel from the support to the surface of the object an elevation part, an optional isolation part, and a skin part; and establish a colorant composition of pass pixels based on a part of the pixel to which the pass pixel contributes, wherein the elevation part comprises an arbitrary colorant composition, the optional isolation part comprises mainly one of the colorants, and the skin part comprises colorants according to the color of the corresponding pixel; and wherein the print engine is to print the pass images on top of each other in a predetermined order by applying said established colorant composition for printing the pass pixels, comprising said varying an amount of printed material that is printed per pass pixel.

* * * * *